United States Patent [19]

Metcalf

[11] Patent Number: 5,662,047
[45] Date of Patent: Sep. 2, 1997

[54] STEERING WHEEL TRAY

[75] Inventor: Derek N. G. Metcalf, LaGrange Park, Ill.

[73] Assignee: Athena Industries, Inc., LaGrange, Ill.

[21] Appl. No.: 717,714

[22] Filed: Sep. 23, 1996

[51] Int. Cl.$^6$ .................................. A47B 23/00
[52] U.S. Cl. .............................. 108/44; 224/276
[58] Field of Search ........................ 108/44, 45, 43, 108/46, 47, 134, 135; 224/273, 276

[56] References Cited

U.S. PATENT DOCUMENTS

| | | | |
|---|---|---|---|
| 1,259,532 | 3/1918 | Leach | 108/134 X |
| 1,364,509 | 1/1921 | Nielson | 108/44 |
| 2,211,962 | 8/1940 | Morris | 108/44 X |
| 2,856,251 | 10/1958 | Garrison | 108/44 |
| 2,873,139 | 2/1959 | Borders, Jr. et al. | 108/44 X |
| 3,643,606 | 2/1972 | Vise | 108/44 |
| 4,890,559 | 1/1990 | Martin | 108/134 X |

*Primary Examiner*—Jose V. Chen
*Attorney, Agent, or Firm*—McCaleb, Lucas & Brugman

[57] ABSTRACT

A portable fold-up, tray attachable to the steering wheel of a motorized vehicle made up of two rigid, U-shaped frames of different size so that the smaller thereof is nestable within the larger frame corresponding arms of the two frames are pivotally interconnected to afford folding movement of the smaller frame relative to the larger frame. Stops are provided for limiting such folding movement and a pair of rigid links are pivotally joined to the arms of the larger frame to move outwardly therefrom in a direction opposite to the movement of the smaller frame; such links carrying parallel, elongated members for embracing the front and back sides of a peripheral portion of the vehicle steering wheel whereby to removeably support the tray in working position.

2 Claims, 2 Drawing Sheets

STEERING WHEEL TRAY

This invention relates to portable tray structures mountable on a motor vehicle steering wheel for the purpose of undersupporting articles, such as lap top personal computers or the like in accessible use position in front of the steering wheel.

Ever increasing popularity of small lap top or notebook portable computers has resulted in fairly widespread use thereof by various personnel in automobiles where the users frequently have discovered the inconvenience of supporting the computers on a car seat or in a lap when attempting to enter or process data. This problem is compounded if the computer is connected to the automobile power supply by auxiliary cables and connectors or is used in conjunction with a printer, cellular modem or other associated computer equipment.

In an effort to meet this problem portable trays or table supports have been advanced in the prior art for attachment to a vehicle steering wheel and although such known structures generally provide the intended stable support for the computer or the like, the vertical location and positioning of the support area or tray coupled with a general lack of or limited adjustability, have resulted in general user dissatisfaction. In those instances where sufficient adjustability of the table or support area has been provided, resulting structures often are heavy or cumbersome and/or frequently have over complicated and inconvenient adjustment systems.

Thus, the need for the simple, compact, relatively lightweight and portable tray structure capable of being readily mounted on a steering wheel of a motor vehicle or of being conveniently stored in a briefcase or the like remains unsatisfied.

SUMMARY OF THE INVENTION

The tray structure of this invention provides a simple portable steering wheel supported assembly which readily may be collapsed into nearly planar compact condition for convenient transport in a briefcase or storage beneath the front seat of a motor vehicle, by way of example. The assembly comprises a pair of rigid, U-Shaped frames, one of which is smaller than the other so that it nests closely within the larger frame. Coaxial pivots interjoin correspond parallel arms of the two U-shaped frames so that the smaller frame is pivotal between it's nested position within the larger frame and a support position extending outwardly thereof. The smaller frame carries a plurality of rigid support members extending between it's arms to provide an undersupport for articles, such as a lap top computer or the like. The larger frame also carries a pair of parallel rigid links pivotally secured to its arms and which are moveable toward and away from the backside of the larger frame. Plural parallel spaced rods extend between the two links and across the width of the larger frame for the insertion of an upper peripheral portion of a steering wheel between adjacent rods. Both the smaller frame and the rigid links engage frictional washers at their pivotal connections with the larger frame whereby they are positionable at selected stable positions of their pivotal movements. Stop members are provided for limiting pivotal movements of the smaller frame and link relative the larger frame.

It is an important object of this invention to overcome the aforenoted objections and detractions of the prior art developments for steering wheel mounted tray structures particularly designed for use in supporting compact personal computers in an automobile.

Another important object of this invention is to provide an improved portable tray structure capable of supporting a compact personal computer or the like which is lightweight, compact, simple to operate, economical to manufacture and easily transported.

Having described this invention, the above and further objects, features and advantages thereof will be recognized from the following detailed description of a preferred embodiment illustrated in the accompanying drawings.

IN THE DRAWINGS

Figure 2:
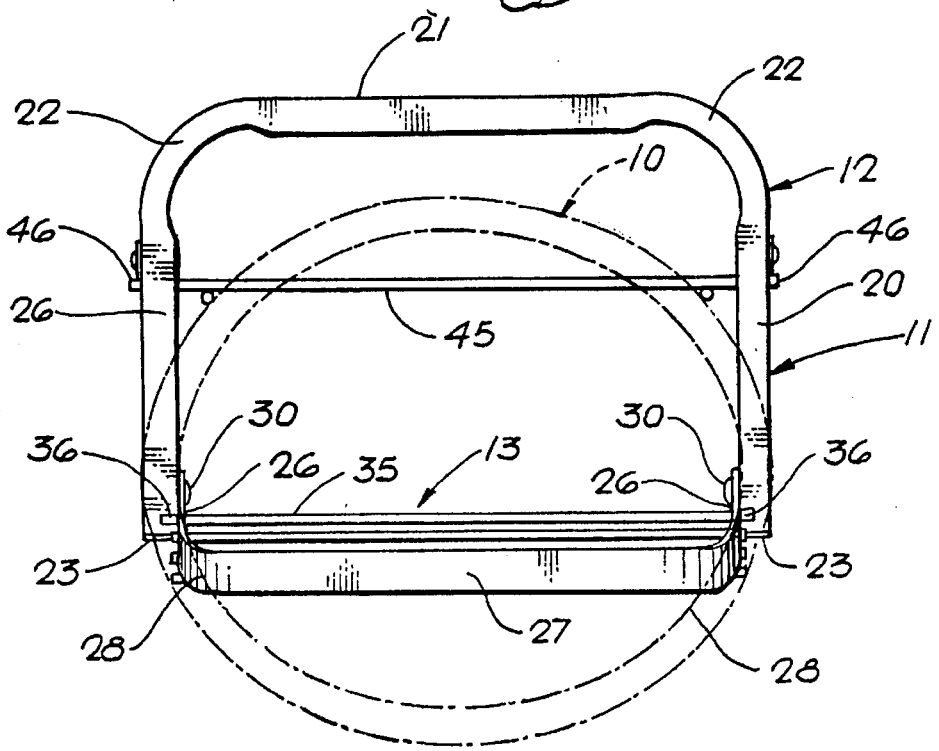
FIG. 2 is a front elevational view of the tray structure shown in FIG. 1 indicating the steering wheel in dotted lines.
Figure 3:
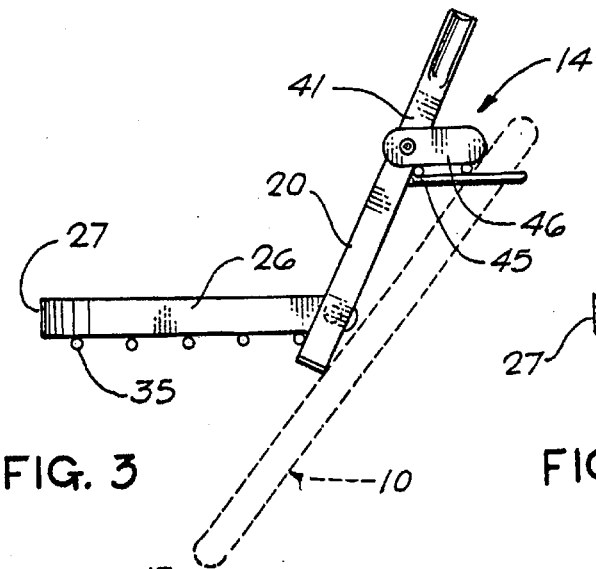
Figure 4:
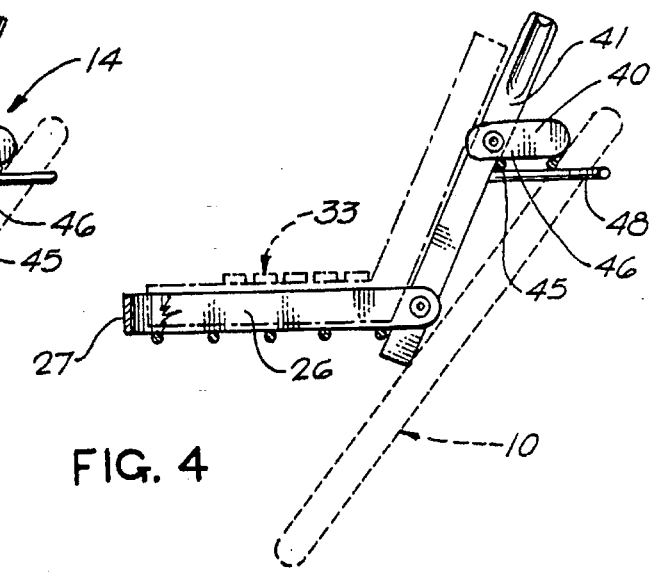
Figure 5:
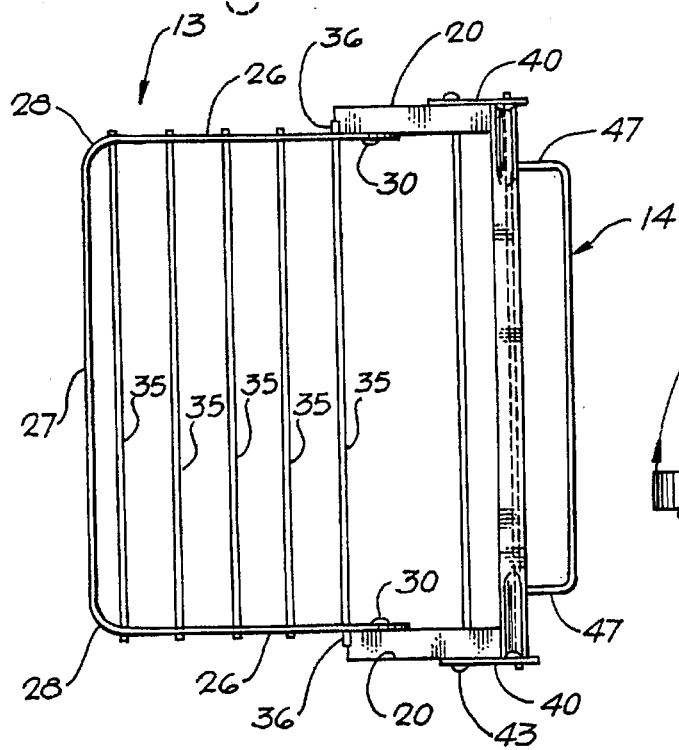
Figure 6:
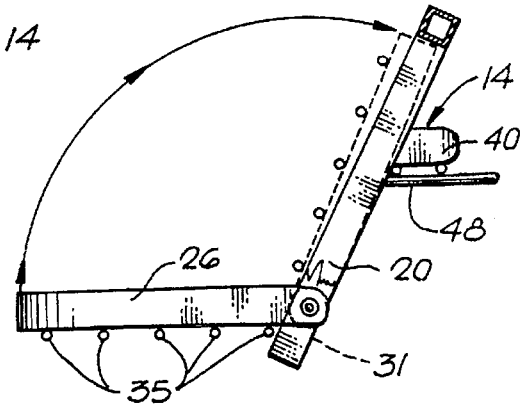

FIG. 3 side elevational view of the tray structure in it's mounted position on a steering wheel shown in dotted lines, as in FIG. 2;

FIG. 4 is a side elevational view corresponding to FIG. 3, indicating a compact computer in dotted lines, mounted thereon;

FIG. 5.is a top plan view of the tray structure shown in FIG. 3, divorced of the steering wheel;

FIG. 6 is a side elevational view of the tray shown in FIG. 5 with portions broken away in section and indicating the nested position of the smaller frame in dotted lines; and.

Figure 7:
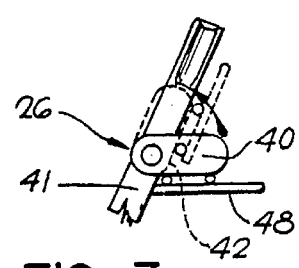

FIG. 7 is a partial, side elevational view of the upper end of the wheel mounted tray, as shown in FIGS. 3–6, illustrating the retracted position of the wheel engaging mounting assembly.

DESCRIPTION OF THE PREFERRED EMBODIMENT

Figure 1:
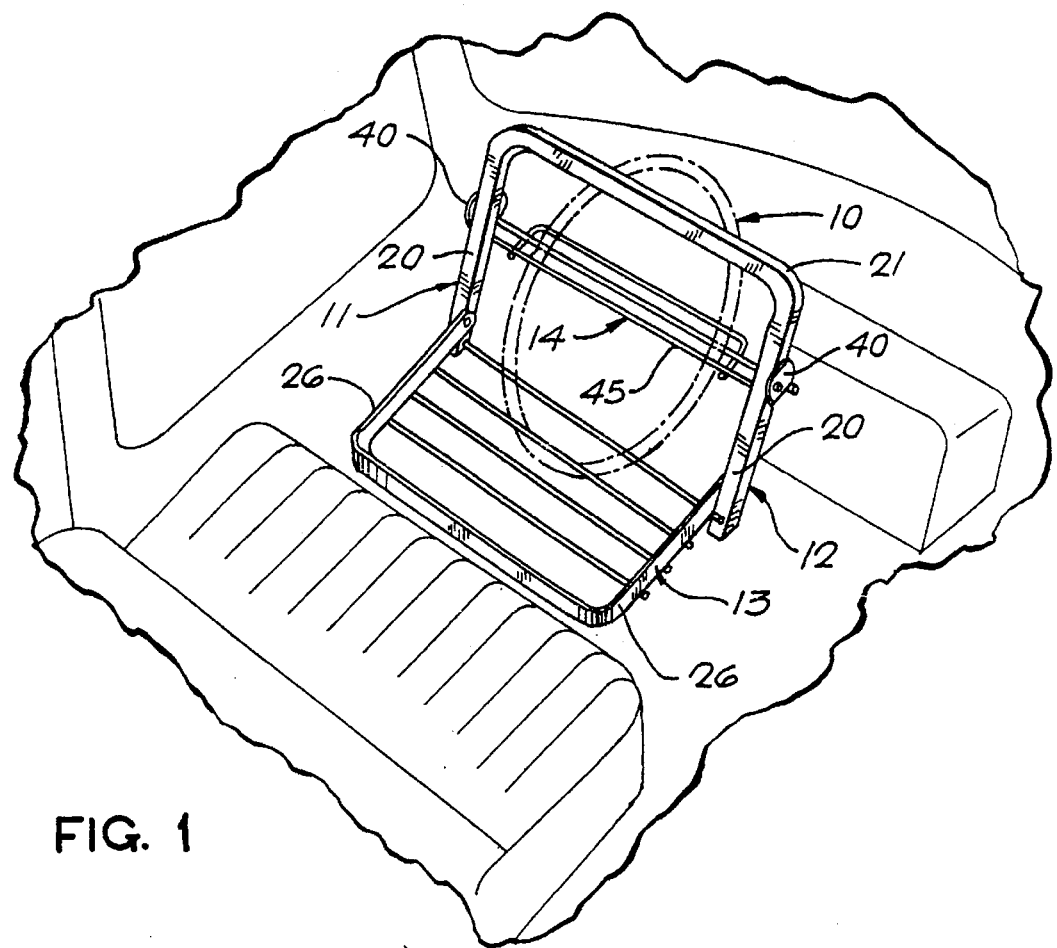
FIG. 1 is a partial perspective view illustrating the tray assembly of this invention mounted on a steering wheel in a motor vehicle.

Turning now to FIG. 1 of the drawings it will be recognized that a partial interior of a typical automobile is represented wherein steering wheel 10 is shown supporting a tray structure 11 according to this invention. It will be appreciated that the tray structure hereof comprises a pair of U-shaped frame members 12 and 13 and a steering wheel suspension assembly 14.

With reference now to FIGS. 2–7 of the drawings, particulars of the several elemental portions 11–14 will be described.

As best illustrated in FIGS. 2 and 5 of the drawings, the larger frame member 12 preferably is made of lightweight metal tubing of rectangular, in this case square, cross section formed into the aforenoted U-shape to provide a pair of parallel spaced linear arms 20, 20 interjoined at one end with a cross bar 21 integrally joined with the arms 20, 20 by means of intervening curvilinear corner portions 22, 22. The outer or free ends of the arms 20, 20 are suitably closed by insertible caps or similar closure members indicated at 23.

The second or smaller frame member 13, in contrast to the tubular formation of frame 12, preferably is formed of a relatively heavy gauge strap material, preferably lightweight metal such as aluminum although both frames 12 and 13 may be formed of rigid, molded plastic, if desired. Frame 13 is U-shaped, as mentioned, to comprise a pair or parallel spaced linear arm portions 26, 26 (see FIG. 5) interconnected at one end by a linear cross bar 27 adjoined integrally with the arm portions 26 by intervening curvilinear corner portions 28, 28. The outside dimension between arm portions 26, 26 is substantially equal to the spacing between the inside faces of the tubular arms 20, 20 of frame 12. Typically, with the dimension between the inside faces of the arms 20, 20 in the order of 13½", for example, the distance across the arms 26, 26 is approximately 13⁷⁄₁₆" thereby providing roughly 1/32 of an inch clearance between the arms 26 and 20 of the two frames 12 and 13. This relatively close interfitting of the arms 20 and 26 permits the outside dimensions of frame 13 to nest closely within the inside dimensions of the larger tubular frame 12, thereby promoting a compact relationship between the two frame members for convenient storage in a brief case or beneath a car seat, for example.

In order to accomplish such desired internested relationship of the two frame members, it will be recognized from FIG. 5 in particular, that the arms 20, 20 of the larger frame member are joined pivotally adjacent their Outer ends with corresponding adjacent arms 26 of the smaller frame by means of a pair of coaxially aligned rivet members 30, 30. This arrangement permits the smaller frame 13 to pivot relative to the larger frame member 12 to arrive at a load supporting position illustrated in FIG. 3. It is to be noted that compressive frictional rubber washers, indicated at 31 in FIG. 6 are interposed between the arms 20 and 26 of the frames in surrounding coaxial relation with the rivets 30. When the rivets are set in connective position, washers 31 are compressed sufficiently to provide a frictional interface between corresponding arms 20 and 26. By this arrangement the inner or smaller frame 13 may be positioned at stable selected unfolded positions relative to frame 12 to provide desired user positions.

In order for the fold out frame 13 to perform its intended function of undersupporting a personal computer 33, as indicated in FIG. 4, load supporting means are required. To this end a plurality of rigid rods 35, 35 extend across the width of frame 13, and are secured to the side arms 26, thereof as best shown in FIG. 5. It will be noted that rods 35 parallel the cross bar 27 of frame 13 and serve to provide a suitable platform for supporting a personal computer thereon.

To assist in containing the computer on the frame 13, it will be appreciated that the height or extension of the arms 26 and cross bar 27 above the rods 35 when frame 13 is in a lowered use position (see FIGS. 3–6), provides a railing that prevents the computer from sliding off of platform formed by the several rods 35.

It also is to be noted that one rod 35 adjacent or closest to the pivots 30, extends laterally outwardly of the two arms 26 of frame 13 to provide extended end portions 36 which act as stops, engageable with the front face of the tubular arms 20, 20 of frame 12 whereby to limit opening and closing pivotal movement of frame 13 (see FIG. 6).

Inasmuch as the tray assembly of this invention is intended to be hung from the steering wheel of a motor vehicle, as previously related, the suspension assembly 14 is provided.

To that end assembly 14 comprises a pair of short pivot links 40, 40 that are pivotally secured to the outside face or wall 41 of the arms 20 of frame 12. As in the mounting of frame 13, inside of frame 12, suitable rubber washers 42 are compressed between the two links 40 and the outer walls 41 of frame 12 to frictionally oppose pivotal movement of the links 40. Thus assembly 14 may be positioned selectively relative to frame 12 for purposes of adjusting the position of the tray assembly on the steering wheel.

As best shown in FIG. 1, assembly 14 also includes a plurality (at least two) elongated rods 45, 45 that extend between and are rigidly fixed, as by welds, to the edges 46 of links 40 (see FIGS. 2–4). Additionally, a U-shaped rod, having parallel short arms 47, 47, cross connected by an elongated base leg 48 is welded to the underside of the rods 45, to provide an elongated opening between leg 48 and an adjacent rod 45 for receiving an upper peripheral portion of the steering wheel rim therein. The space between the two rods 45, 45 also may receive the upper periphery of the steering wheel therethrough, if desired, to provide two alternate positions for mounting the tray assembly 11 on the steering wheel, depending on the incline or attitude of the steering wheel. In this latter regard, the lower end at frame 12 engages the wheel 10 and if the steering wheel is tiltable, then still further adjustment of the attitude or incline of the larger frame 12 of the tray assembly is available to fit the user's needs. It will be appreciated that depending on which opening of the suspension means 14 is Used to hang the tray assembly on the steering wheel, and the angular positioning of the links 40 the incline of frame 12 of the tray assembly may be adjusted relative to the wheel 10.

As best indicated in FIG. 6, when it is desired to remove the tray assembly from the steering wheel and store it in a collapsed state, the suspension assembly is folded upwardly toward frame 12, so that links 40 align with the sides of frame 12 and rods 45 of the suspension assembly engage the rearward faces of the frame arms 20. The tray frame 13 likewise is folded into frame 12, to complete collapse of the tray assembly of this invention.

From the foregoing it is believed that those skilled in the art will readily recognize the novel advancement of this invention over the prior art and understand that while the same has herein been described in relation to a preferred embodiment illustrated in the accompanying drawings, the same is nevertheless susceptible to change, modification and substitution of equivalents without departing from the spirit and scope of this invention which is intended to be unlimited by the foregoing except as may appear in the following appended claims.

The embodiments of the invention in which an exclusive property or privilege is claimed are defined as follows:

1. A portable tray assembly attachable to a motor vehicle steering wheel for supporting articles thereon, such as a personal computer, comprising:

a pair of rigid, U-shaped frames, each comprising a pair of parallel linear arms interjoined at one end by a co-planar transverse cross bar, said frames being of unequal size whereby the smaller of said frames is nestable in co-planar relation with the larger of said frame;

coaxial pivot means interjoining said frames adjacent corresponding free ends of said arms thereof, limit means restricting pivotal movement of said smaller frame toward and away from a front side, of said larger frame; and suspension means pivotally connected to the arms of said larger frame for removeably coupling the tray assembly to the vehicle steering wheel;

said suspension means comprising a pair of rigid, linear links pivotally joined to said arms of the larger frame for pivotal movement toward and away from an operationally backside of said larger frame, and plural parallel spaced, rigid rods extending between said links and across said backside for receiving an upper peripheral portion of said steering wheel in a selected space between adjacent said rods.

2. The assembly of claim 1, wherein said smaller frame has a plurality of rigid members extending transversely between and across said arms thereof for undersupporting articles; a portion of at least of one of said rigid members extending laterally outwardly of at least one of said arms of said smaller frame to form said limit means; said at least one portion being interferingly engageable with at least one of said arms of said larger frame when said smaller frame is at desired limits of its pivotal movement.

* * * * *

UNITED STATES PATENT AND TRADEMARK OFFICE
CERTIFICATE OF CORRECTION

PATENT NO. : 5,662,047
DATED : September 2, 1997
INVENTOR(S) : DEREK N. G. METCALF It is certified that error appears in the above-identified patent and that said Letters Patent is hereby corrected as shown below:

Abstract line 4, delete "are", and insert -- being --;

Col. 3, line 14, delete "Outer" and insert -- outer --;

Col. 4, line 15, delete "Used" and insert -- used --.

Signed and Sealed this

Eighteenth Day of November 1997

Attest:

BRUCE LEHMAN

*Attesting Officer*     *Commissioner of Patents and Trademarks*